(12) United States Patent
Kinouchi et al.

(10) Patent No.: US 11,215,784 B2
(45) Date of Patent: Jan. 4, 2022

(54) LENS BARREL AND CAMERA

(71) Applicant: NIKON CORPORATION, Tokyo (JP)

(72) Inventors: Yuki Kinouchi, Tokyo (JP); Kentaro Terao, Tokyo (JP); Satoshi Kazahaya, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 91 days.

(21) Appl. No.: 16/317,926

(22) PCT Filed: Jul. 12, 2017

(86) PCT No.: PCT/JP2017/025399
§ 371 (c)(1),
(2) Date: Jan. 15, 2019

(87) PCT Pub. No.: WO2018/012531
PCT Pub. Date: Jan. 18, 2018

(65) Prior Publication Data
US 2019/0293902 A1     Sep. 26, 2019

(30) Foreign Application Priority Data
Jul. 15, 2016   (JP) .............................. JP2016-140045

(51) Int. Cl.
*G02B 7/04*     (2021.01)
*G02B 7/02*     (2021.01)
*G03B 13/34*    (2021.01)
*G02B 7/08*     (2021.01)

(52) U.S. Cl.
CPC ............... *G02B 7/04* (2013.01); *G02B 7/021* (2013.01); *G02B 7/08* (2013.01); *G03B 13/34* (2013.01)

(58) Field of Classification Search
CPC . G02B 7/04; G02B 7/08; G02B 7/102; G02B 7/021; G03B 3/10; G03B 13/34; G03B 2205/0053
(Continued)

(56) References Cited

U.S. PATENT DOCUMENTS

2010/0172032 A1*  7/2010  Fukino ..................... G02B 7/10
                                                              359/700
2011/0122518 A1*  5/2011  Musha ................... G02B 7/021
                                                              359/824
(Continued)

FOREIGN PATENT DOCUMENTS

| CN | 102692692 A | 9/2012 |
| CN | 104969109 A | 10/2015 |

(Continued)

OTHER PUBLICATIONS

Sep. 12, 2017 International Search Report issued in International Patent Application No. PCT/JP2017/025399.
(Continued)

*Primary Examiner* — Mohammed A Hasan
(74) *Attorney, Agent, or Firm* — Oliff PLC

(57) ABSTRACT

A lens barrel and camera moves a lens in the optical axis direction at a high speed. This lens barrel is provided with: a first electromagnetic drive unit; a first lens holding frame, which holds a first lens, and moves the first lens in the optical axis direction by means of the first electromagnetic drive unit; a second electromagnetic drive unit; and a second lens holding frame, which holds a second lens, and moves the second lens in the optical axis direction by means of the second electromagnetic drive unit. The first lens holding frame is disposed on the inner circumference side of the second lens holding frame.

9 Claims, 5 Drawing Sheets

(58) Field of Classification Search
USPC .......................................................... 359/823
See application file for complete search history.

(56) References Cited

U.S. PATENT DOCUMENTS

| | | | |
|---|---|---|---|
| 2015/0002949 A1* | 1/2015 | Ito | G02B 7/08 |
| | | | 359/823 |
| 2015/0009346 A1* | 1/2015 | Yasuda | G03B 5/00 |
| | | | 348/208.11 |
| 2015/0062408 A1 | 3/2015 | Yano | |
| 2015/0312454 A1 | 10/2015 | Iiyama et al. | |
| 2020/0218030 A1* | 7/2020 | Kishimoto | G02B 7/021 |

FOREIGN PATENT DOCUMENTS

| | | |
|---|---|---|
| JP | 2000-089088 A | 3/2000 |
| JP | 2004-078012 A | 3/2004 |
| JP | 2007-199253 A | 8/2007 |
| JP | 2012-203263 A | 10/2012 |
| JP | 2015-049334 A | 3/2015 |

OTHER PUBLICATIONS

Feb. 14, 2020, Extended European Search Report issued in the European Patent Application No. EP17827658.0.
Aug. 4, 2020 Office Action issued in Chinese Patent Application No. 201780042695.1.
Mar. 9, 2021 Office Action issued in Japanese Patent Application No. 2018-527628.
Apr. 12, 2021 Office Action issued in Chinese Patent Application No. 201780042695.1.
Sep. 24, 2021 Office Action issued in Chinese Patent Application No. 201780042695.1.

* cited by examiner

LENS BARREL AND CAMERA

TECHNICAL FIELD

The present invention relates to a lens barrel and a camera.

BACKGROUND ART

Heretofore, a lens barrel has been proposed that, in order to move a lens in an optical axis direction at high speed, uses a voice coil motor to drive a lens holding member in the optical axis direction.

Patent Document 1: Japanese Unexamined Patent Application, Publication No. 2015-49334

DISCLOSURE OF THE INVENTION

The lens barrel of the present invention includes: a first holding portion that holds a first lens; a second holding portion that holds a second lens; a first position detection unit that detects an optical axis direction position of the first holding portion; a second position detection unit that detects an optical axis direction position of the second holding portion; a first detected portion that allows the first position detection unit to detect a movement amount of the first holding portion in the optical axis direction; and a second detected portion that allows the second position detection unit to detect a movement amount of the second holding portion in the optical axis direction. The second position detection unit is provided at the first holding portion. The camera of the present invention is equipped with the lens barrel described above.

PREFERRED MODE FOR CARRYING OUT THE INVENTION

First Embodiment

Figure 1:
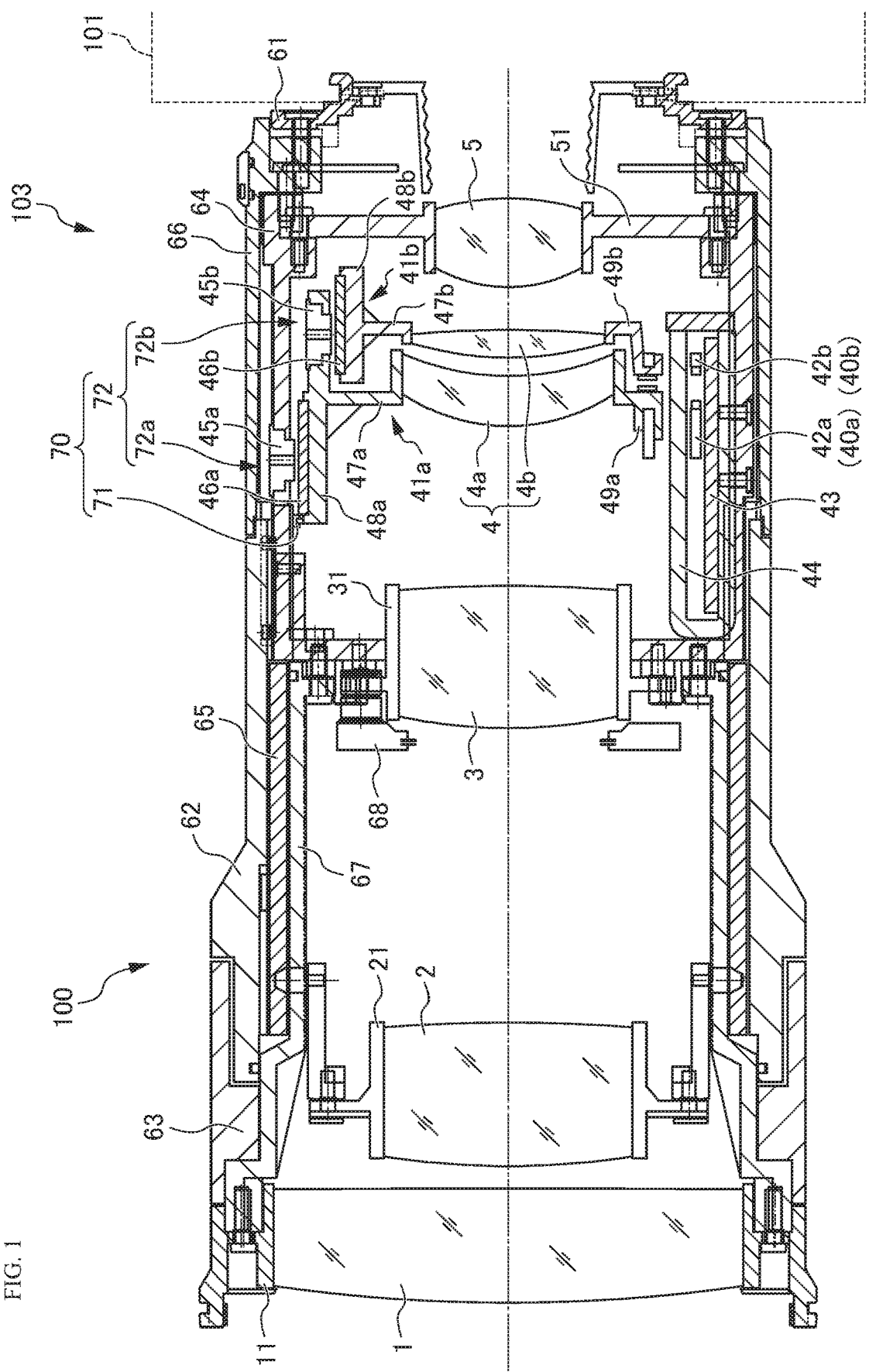
FIG. 1 is a diagram depicting a camera 103 equipped with a lens barrel 100 and camera body 101 according to a first embodiment.

Below, the first embodiment is described with reference to the attached drawings and the like. FIG. 1 is a diagram depicting a camera 103 that is equipped with a lens barrel 100 and camera body 101 according to the first embodiment. In this embodiment, the lens barrel 100 is removeably attachable to the camera body 101, but this is not limiting; the lens barrel and camera body may be integrated.

The lens barrel 100 is equipped with an imaging optical system that includes, from a subject side in an optical axis direction, a first lens unit 1, a second lens unit 2, a third lens unit 3, a fourth lens unit 4 and a fifth lens unit 5. The first lens unit 1 is held by a first lens unit holding frame 11. The second lens unit 2 is held by a second lens unit holding frame 21. The third lens unit 3 is held by a third lens unit holding frame 31. An aperture unit 68 is mounted at the optical axis direction subject side of the third lens unit holding frame 31. The fifth lens unit 5 is held by a fifth lens unit holding frame 51. The fourth lens unit 4 is described below.

The lens barrel 100 is provided with a main fixed portion 64 that covers an outer periphery of the imaging optical system at the optical axis direction camera body side of the imaging optical system. An exterior tube 66 is disposed at an outer periphery of the main fixed portion 64. Portions at the optical axis direction camera body side of the exterior tube 66 protrude to the inner periphery side thereof. The optical axis direction camera body side of the main fixed portion 64 is fixed to these protruding portions. A lens mount 61 is attached to the optical axis direction camera body side of the protruding portions of the exterior tube 66.

The fifth lens unit holding frame 51 is mounted at the inner diametric side of an end portion at the optical axis direction camera body side of the main fixed portion 64. The third lens unit holding frame 31 is mounted at the inner diametric side of an end portion at the optical axis direction subject side of the main fixed portion 64.

A cam ring 65 is disposed at an outer periphery of a sub fixed tube 67. A zoom ring 62 is disposed at the outer periphery of the cam ring 65. A manual focusing ring 63 is disposed at the optical axis direction subject side of the zoom ring 62.

Figure 2:
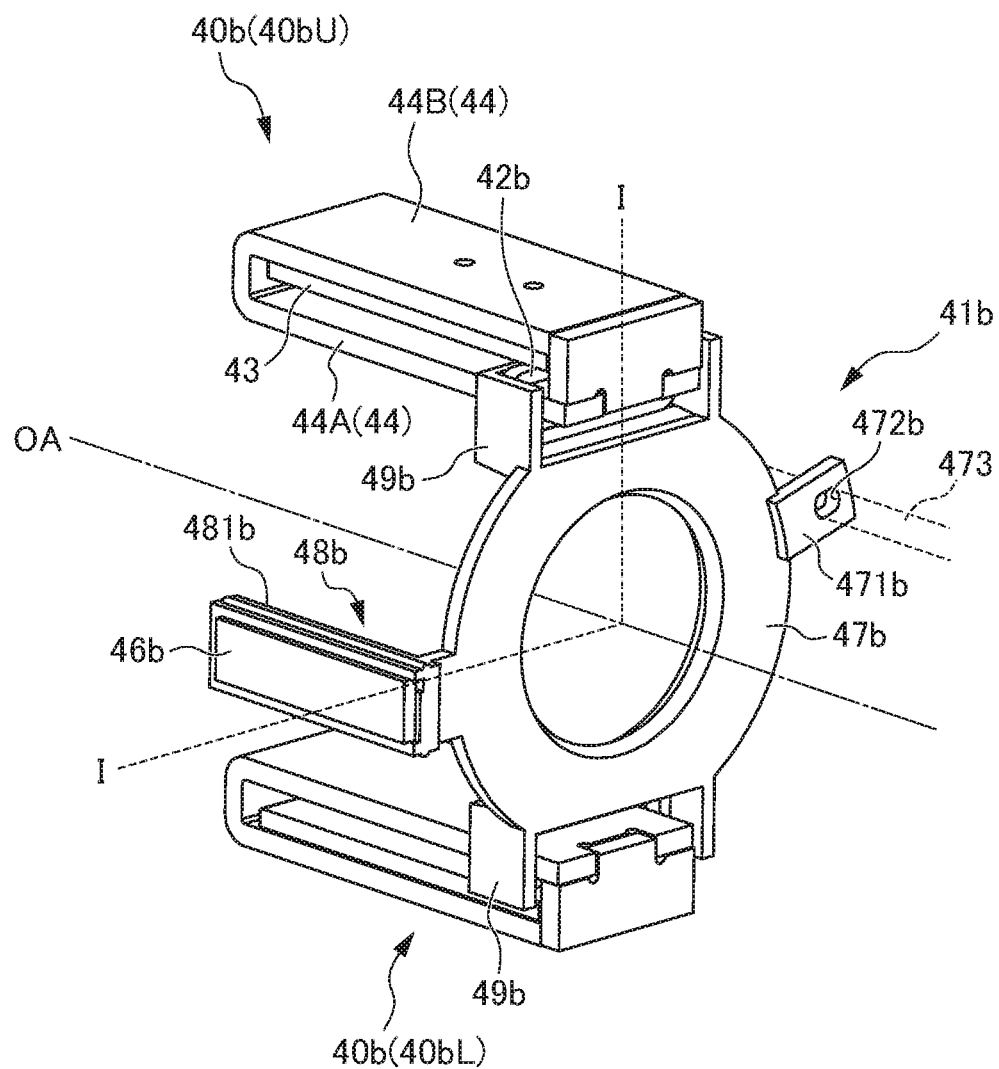
FIG. 2 is a perspective view of a second focusing lens holding frame 41b.
Figure 3:
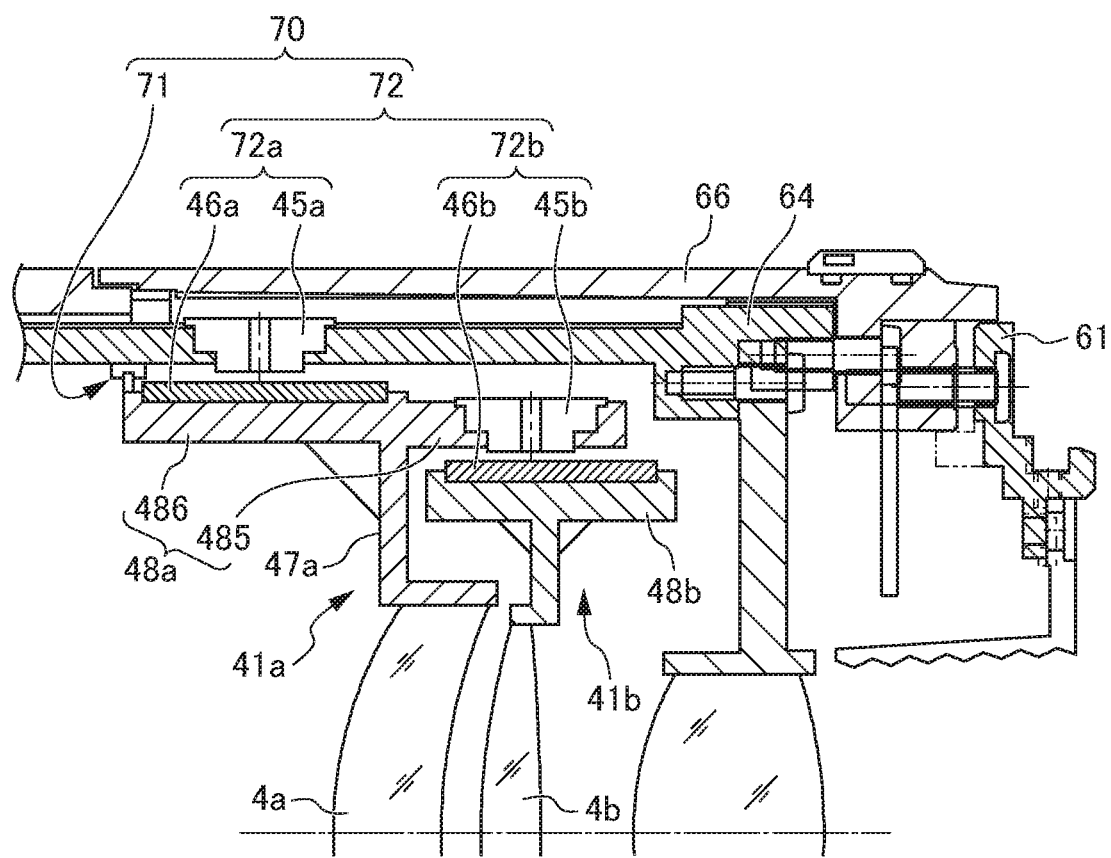
FIG. 3 is a partial magnified view of FIG. 1.

The fourth lens unit 4 is a focusing lens unit with a two-lens structure, including a first focusing lens 4a and a second focusing lens 4b. The first focusing lens 4a is held by a first holding frame 41a, and the second focusing lens 4b is held by the second holding frame 41b. FIG. 2 is a perspective view of the second holding frame 41b. Note that FIG. 1 is a sectional view cut in direction I-I in FIG. 2. FIG. 3 is a partial magnified view of FIG. 1. The first holding frame 41a is equipped, at the outer periphery thereof, with a pair of first voice coil motors 40a at symmetrical positions sandwiching the optical axis. The first voice coil motors 40a drive movement of the first holding frame 41a. The second holding frame 41b is equipped, at the outer periphery thereof, with a pair of second voice coil motors 40b (40bU and 40bL) at symmetrical positions sandwiching the optical axis. The second voice coil motors 40b drive movement of the second holding frame 41b. An annular portion 47a supports the first focusing lens 4a. A first engaging portion (not shown in the drawings) is formed around the periphery of the annular portion 47a. A pair of coil support portions 49a and a guide bar 473 engage with the first engaging portion. The first holding frame 41a is provided with an extended portion 48a that is provided at the outer diametric side of the first holding frame 41a. The extended portion 48a is a rectangular plate-shaped member that extends in the optical axis direction. A first straight-ahead movement key (not shown in the drawings) is formed in a side face of the extended portion 48a, of which side face a length direction is in the optical axis direction and a width direction is substantially in the diametric direction. A first straight-ahead movement groove (not shown in the drawings) is provided at the main fixed portion 64. The first straight-ahead movement key engages with the first straight-ahead movement groove. As shown in FIG. 3, the extended portion 48a is provided with an overlap portion 485 and a first scale holding portion 486. The overlap portion 485 extends in the optical axis direction from the annular portion 47a toward the side thereof at which the second holding frame 41b is disposed. The first scale holding portion 486 extends toward the optical axis direction subject side from the annular portion 47a.

Now, the second holding frame 41b is described. In FIG. 2, the pair of second voice coil motors 40b (40bU and 40bL) that drive movement of the second holding frame 41b are provided at symmetrical positions sandwiching the optical axis at the periphery of the second holding frame 41b.

An annular portion 47b supports the second focusing lens 4b. The second holding frame 41b is provided with a second scale holding portion 48b and a second engaging portion 471b around the periphery of the annular portion 47b. The second engaging portion 471b is disposed at the opposite side of the optical axis from the side thereof at which the second scale holding portion 48b is disposed. The second engaging portion 471b engages with the guide bar 473. The second holding frame 41b is further provided with coil support portions 49b in a pair in a direction orthogonal to a line joining the second scale holding portion 48b with the second engaging portion 471b. The overlap portion 485 of the extended portion 48a of the first holding frame 41a covers the outer diametric side of the second scale holding portion 48b, as shown in FIG. 3. Optical axis direction positions of the first scale holding portion 486 of the extended portion 48a do not overlap with the outer diametric side of the second scale holding portion 48b.

The second voice coil motors 40b (40bU and 40bL) are provided as a pair (a set of two) sandwiching the optical axis. Because the second voice coil motors 40b have the same structures, the same reference symbols are assigned to elements with the same structures in the drawings. In the following descriptions, the second voice coil motors 40b are referred to as such except where more specificity is required.

The second voice coil motors 40b are equipped with coils 42b that are mounted at the coil support portions 49b of the second holding frame 41b. The coils 42b of the second voice coil motors 40bU and 40bL are disposed at symmetrical positions sandwiching the optical axis, are wired up so as to operate together, and are connected to an electrical power source.

Each of the second voice coil motors 40b is provided with a yoke 40 and a magnet 43. The yoke 40 and magnet 43 are shared with the first voice coil motor 40a, which is described below. The yoke 40 is formed of a metal plate with a substantially constant width and a substantially constant thickness, which is inflected in the length direction thereof. The yoke 40 is provided with a pair of arm portions 44A and 44B, which are parallel at a predetermined spacing. The arm portions 44A and 44B are formed with lengths corresponding to movement distances of a respective coil 42a and the respective coil 42b (movement distances of the first holding frame 41a and the second holding frame 41b). The arm portion 44B is fixed to the main fixed portion 64. The magnet 43 is mounted at an inner face of the arm portion 44B. The magnet 43 is formed in a plate shape with a predetermined thickness, in a rectangular shape substantially corresponding with the arm portion 44B. A length of the magnet 43 corresponds with the movement distances of the coil 42b and coil 42a.

The second scale holding portion 48b is a rectangular plate-shaped member extending in the optical axis direction. A substantially rectangular second scale 46b in which a pattern is engraved is attached to an outer face of the second scale holding portion 48b, which outer face extends in the optical axis direction and faces to the outer diametric side. A second straight-ahead movement key 481b that extends in the optical axis direction is formed at a side face that is substantially orthogonal to the outer face of the second scale holding portion 48b.

The second engaging portion 471b is disposed at a location at the opposite side of the optical axis from the side thereof at which the second scale holding portion 48b is disposed. The second engaging portion 471b is formed in a plate shape with a predetermined thickness in the optical axis direction. The second engaging portion 471b is provided with a guide hole 472b that is formed penetrating through the second engaging portion 471b in the optical axis direction. The guide hole 472b is an elongated hole. The guide hole 472b is formed such that the guide bar 473, which is represented by dotted lines in FIG. 2, slides with free play in the long diameter direction of the guide hole 472b and fits tightly in the short axis direction of the guide hole 472b, to be capable of sliding. Because the guide bar 473 is inserted through the second engaging portion 471b, rotation of the second holding frame 41b is restricted.

Similarly to the second voice coil motors 40b, the first voice coil motors 40a are equipped with the coils 42a, which are mounted at the coil support portions 49a of the first holding frame 41a. The yoke 40 and magnet 43 of each of the first voice coil motors 40a are shared with the second voice coil motor 40b as described above.

When the coils 42a of the first voice coil motors 40a and the coils 42b of the second voice coil motors 40b are respectively electrified, Lorentz forces are produced at the coils 42a and coils 42b. The Lorentz forces produce driving forces in the optical axis direction, and drive the first holding frame 41a and the second holding frame 41b in the optical axis direction.

A straight-ahead movement groove (not shown in the drawings) is provided at the first holding frame 41a. The straight-ahead movement groove engages with the second straight-ahead movement key 481b provided at the second scale holding portion 48b of the second holding frame 41b.

The second holding frame 41b and first holding frame 41a move by straight-ahead movement. When the straight-ahead movement of the second holding frame 41b is guided by the first holding frame 41a, as in the present embodiment, it is easier to attain an accurate position of the second holding frame 41b relative to the first holding frame 41a than if the straight-ahead movements of both the first holding frame 41a and the second holding frame 41b were guided by, for example, a common main guide bar.

As illustrated in FIG. 2, the length of the second straight-ahead movement key 481b in the optical axis direction is longer than the breadth of the second engaging portion 471b in the optical axis direction. That is, a mating length of the second straight-ahead movement key 481b with the straight-ahead movement groove provided in the first holding frame 41a, which is not shown in the drawings, is longer than a mating length of the second engaging portion 471b with the guide bar 473. Therefore, because this one of the mating lengths is longer, twisting and the like does not occur when the focusing lens is driven.

In addition, a length of the first straight-ahead movement key in the optical axis direction is longer than a breadth of the first engaging portion in the optical axis direction. That is, a mating length of the first straight-ahead movement key with the straight-ahead movement groove provided in the first holding frame 41a, which is not shown in the drawings, is longer than a mating length of the first engaging portion with the guide bar 473. Therefore, because this one of the mating lengths is longer, twisting and the like does not occur when the focusing lens is driven.

The lens barrel 100 is equipped with a position detection apparatus 70 that detects positions of the first holding frame 41a and the second holding frame 41b. The position detection apparatus 70 is provided with an absolute position detection apparatus 71 and a relative position detection apparatus 72. The absolute position detection apparatus 71 is, for example, a photo interrupter and is attached to, for example, the inner diametric side of the main fixed portion 64 and a distal end of the first holding frame 41a.

The relative position detection apparatus 72 is, for example, an optical position detection device. The relative position detection apparatus 72 is equipped with, for example, a scale and a sensor portion, which is provided with a light emission unit and a light detection unit. A pattern is engraved in the scale. The pattern engraved in this optical scale is optically detected by the light emission unit and light detection unit. An optical position detection device is employed in this embodiment but this is not limiting; a magnetic position detection device may be used.

The relative position detection apparatus 72 is provided with a first position detection apparatus 72a and a second position detection apparatus 72b. The first position detection apparatus 72a is equipped with a first position detection sensor 45a, which is attached to the main fixed portion 64, and a first scale 46a at the outer diametric side of the second scale holding portion 48b. The first position detection sensor 45a is mounted at a position from which the first scale 46a can be read.

The second position detection apparatus 72b is equipped with a second position detection sensor 45b, which is attached to the overlap portion 48S, and the second scale 46b attached to the outer diametric side of the second scale holding portion 48b. The second position detection sensor 45b is mounted at a position from which the second scale 46b can be read.

When the first holding frame 41a is driven in the optical axis direction by the first voice coil motors 40a, the first scale 46a also moves in the optical axis direction, and the scale of the first scale 46a is read by the first position detection sensor 45a. A position of the first focusing lens 4a relative to the main fixed portion 64 may be detected from position information detected by the first position detection sensor 45a.

When the second holding frame 41b is driven in the optical axis direction by the second voice coil motors 40b, the second scale 46b also moves in the optical axis direction, and the scale of the second scale 46b is read by the second position detection sensor 45b. Because the second position detection sensor 45b is attached to the first holding frame 41a that holds the first focusing lens 4a, a position of the second focusing lens 4b relative to the first focusing lens 4a may be detected from position information detected by the second position detection sensor 45b.

Effects (1) In an optical system in which an image is focused by driving of plural focusing lenses—the first focusing lens 4a and the second focusing lens 4b—as in the present embodiment, it is important to control a spacing between the focusing lenses accurately to improve optical performance and autofocus accuracy.

The lens barrel 100 according to the present embodiment is equipped with the first holding frame 41a and second holding frame 41b that hold the first focusing lens 4a and second focusing lens 4b, respectively, and with the first position detection sensor 45a and second position detection sensor 45b. The first scale 46a and second scale 46b, movement amounts of which are detected by the first position detection sensor 45a and second position detection sensor 45b, are provided at the first holding frame 41a and second holding frame 41b. The first position detection sensor 45a is mounted at the first holding frame 41a. Therefore, a spacing between the focusing lenses may be directly detected by the second position detection sensor 45b, and accuracy of detection of the spacing is improved.

(2) Relative movement amounts of the focusing lenses during zooming are very small. According to the present embodiment, the short second scale 46b may be employed in the second position detection apparatus 72b without any need to give consideration to movement amounts during zooming. Therefore, costs may be lowered.

(3) Because the second position detection apparatus 72b may employ the short second scale 46b, variations in spacing between the second position detection sensor 45b and the second scale 46b are reduced. Thus, positions may be detected with higher accuracy.

(4) A straight-ahead movement guiding mechanism is required to move the first holding frame 41a and the second holding frame 41b parallel with the optical axis. In this embodiment, the first scale 46a and second scale 46b of the relative position detection apparatus 72 are mounted at portions of the first holding frame 41a and second holding frame 41b at which the straight-ahead movement keys, which serve as the straight-ahead guiding mechanism, are provided. Therefore, shifts of the first scale 46a and the second scale 46b are reduced, and an effect of position detection with higher accuracy is provided.

Comparative Example

Figure 4:
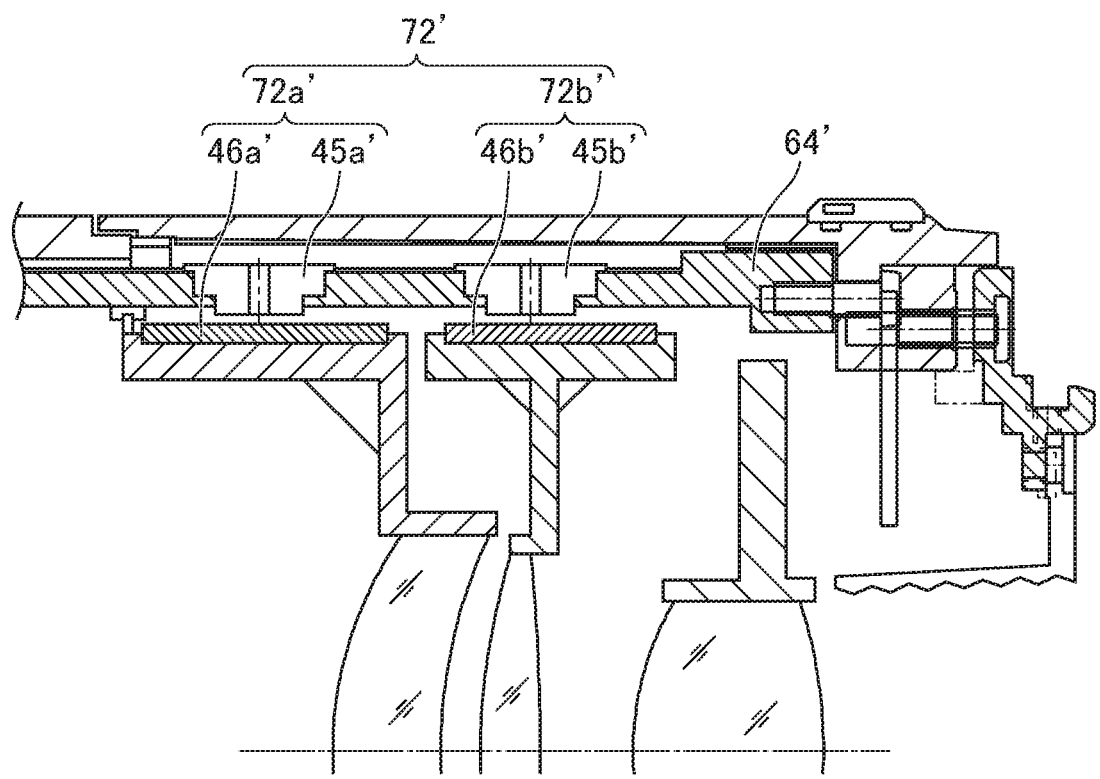
FIG. 4 is a diagram corresponding to FIG. 3 that depicts a comparative example.

FIG. 4 is a diagram corresponding to FIG. 3 that depicts a comparative example contrasting with the embodiment. A difference between the comparative example and the embodiment is that a first position detection sensor 45a' and a second position detection sensor 45b' are both mounted at a main fixed portion 64'.

In the comparative example, respective positions of the first holding frame 41a and the second holding frame 41b must be detected by the first position detection sensor 45a' and the second position detection sensor 45b' and then the detection data must be used to calculate the spacing between the first holding frame 41a and the second holding frame 41b.

That is, the spacing between the first holding frame 41a and the second holding frame 41b must be calculated by combining data that can be acquired from the first position detection sensor 45a' and the second position detection sensor 45b'. Consequently, errors at the sensors aggregate and affect the calculated results.

In the present embodiment, by contrast, the spacing between the focusing lenses may be detected directly with a single sensor. Thus, spacing detection accuracy is improved.

In the case of an optical system in which the first focusing lens 4a and second focusing lens 4b are driven during zooming, the structure of the comparative example requires sensors capable of detecting movement amounts caused by zooming and movement amounts caused by focusing, at all of the focusing lenses.

Therefore, the position detection sensors of the comparative example may be long in the optical axis direction and difficult to arrange, which leads to constraints on optical design, such as an increase in spacing between front and rear lenses, limits on movement amounts during focusing and the like. In contrast, this problem does not arise in the embodiment.

Second Embodiment

Figure 5:
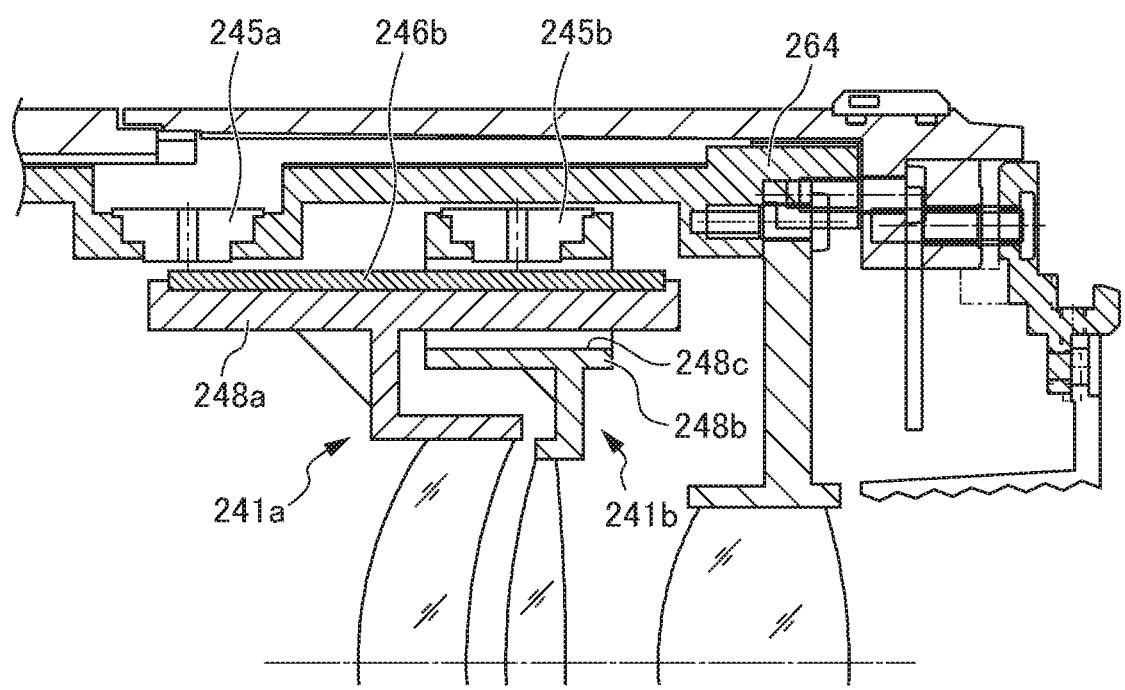
FIG. 5 is a diagram corresponding to FIG. 3 that depicts a second embodiment.

FIG. 5 is a diagram corresponding to FIG. 3 that depicts the second embodiment. The second embodiment differs from the first embodiment in the following respects. A second scale holding portion 248b of a second holding frame 241b does not hold a scale. The second scale holding portion 248b includes a penetrating hole 248c in the optical axis direction. A second position detection sensor 245b is mounted at an outer diametric side of the penetrating hole 248c. A first scale holding portion 248a of a first holding frame 241a penetrates through the penetrating hole 248c. A scale 246a is mounted at an outer diametric side face of the first scale holding portion 248a. The scale 246a has a length that allows reading by both a first position detection sensor 245a and the second position detection sensor 245b.

That is, in the second embodiment, the single scale 246a is used with both the first position detection sensor 245a and the second position detection sensor 245b.

According to the structure of the second embodiment, in addition to the effects of the first embodiment, a single scale may be employed with plural sensors, and a further improvement in detection accuracy is anticipated. In addition, costs may be lowered.

The described embodiments are not limiting. The embodiments and variant examples may be used in suitable combinations; detailed descriptions thereof are not given here. The present invention is not limited by the embodiments described above.

EXPLANATION OF REFERENCE NUMERALS

4a: first focusing lens, 4b: second focusing lens, 40: yoke, 40a: first voice coil motors, 40b: second voice coil motors, 41a: first holding frame, 41b: second holding frame, 42a: coils, 42b: coils, 43: magnets, 44: arm portions, 45a: first position detection sensor, 45b: second position detection sensor, 46a: first scale, 46b: second scale, 48b: second scale holding portion, 72a: first position detection apparatus, 72b: second position detection apparatus, 100: lens barrel, 241a: first holding frame, 241b: second holding frame, 245a: first position detection sensor, 245b: second position detection sensor, 246a: scale, 248a: first scale holding portion, 248b: second scale holding portion, 248c: penetrating hole, 471b: second engaging portion, 472b: guide hole, 481b: second straight-ahead movement key, 485: overlap portion, 486: first scale holding portion, 486: second scale holding portion

The invention claimed is:

1. A lens barrel comprising:
a first focusing lens;
a first focusing lens holding frame that holds the first focusing lens;
a first drive unit that drives by electric power and directly moves the first focusing lens holding frame in an optical axis direction;
a second focusing lens;
a second focusing lens holding frame that holds the second focusing lens; and
a second drive unit that drives by electric power and directly moves the second focusing lens holding frame in the optical axis direction,
wherein the first focusing lens holding frame is disposed at an inner circumference side of the second focusing lens holding frame, and
wherein the first focusing lens and the second focusing lens are respectively moved in the optical axis direction by the first drive unit and the second drive unit during focusing.

2. The lens barrel according to claim 1, further comprising a first detection unit that detects a positional relationship between the first focusing lens holding frame and the second focusing lens holding frame.

3. The lens barrel according to claim 2, wherein the first detection unit includes a detected portion,
the detected portion being held parallel with a first engaging portion at the first focusing lens holding frame, and the first engaging portion engaging with the second focusing lens holding frame.

4. The lens barrel according to claim 1, further comprising:
a tube that holds at least one of the first drive unit and the second drive unit; and
a second detection portion that detects a positional relationship between the second focusing lens holding frame and the tube.

5. The lens barrel according to claim 1, further comprising a guide bar that is inserted through the first focusing lens holding frame.

6. The lens barrel according to claim 5, wherein the first focusing lens holding frame includes: a first engaging portion that engages with the second focusing lens holding frame; and a first hole portion through which the guide bar is inserted,
and a length of the first engaging portion in the optical axis direction is longer than a length of the first hole portion in the optical axis direction.

7. The lens barrel according to claim 5, further comprising a tube that holds at least one of the first drive unit and the second drive unit,
wherein the second focusing lens holding frame includes a second engaging portion that engages with the tube.

8. The lens barrel according to claim 7, wherein the guide bar is inserted through the second focusing lens holding frame,
the second focusing lens holding frame includes a second hole portion through which the guide bar is inserted,
and a length of the second engaging portion in the optical axis direction is longer than a length of the second hole portion in the optical axis direction.

9. An imaging device comprising the lens barrel according to claim 1.

* * * * *